C. E. H. ARMBRUSTER.
MECHANISM FOR CONTROLLING THE FLOW OF FLUID TO AND FROM AN AIR TIGHT CHAMBER.
APPLICATION FILED SEPT. 2, 1914.
1,172,661.
Patented Feb. 22, 1916.
2 SHEETS—SHEET 1.
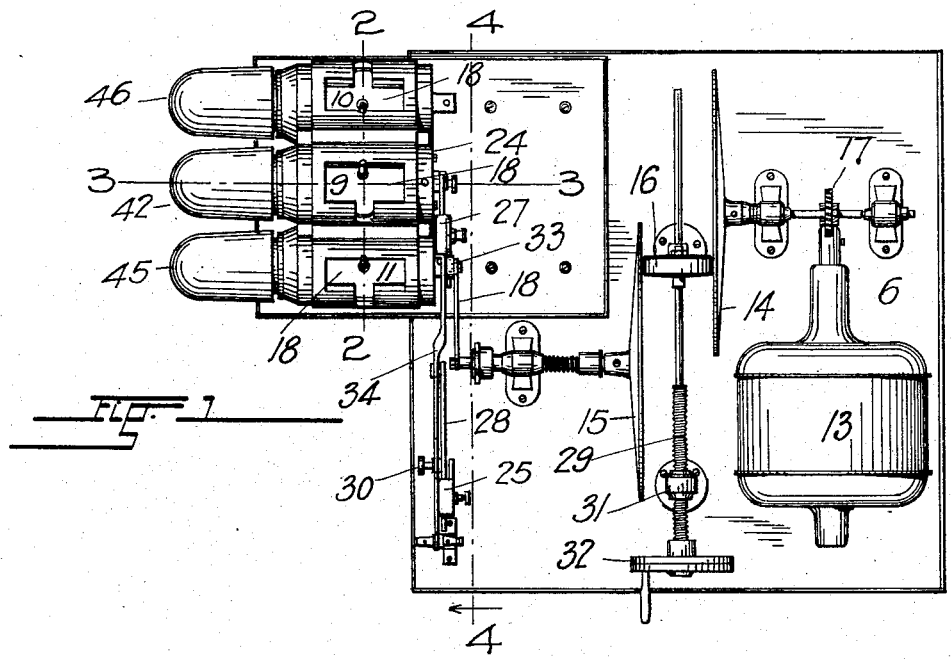
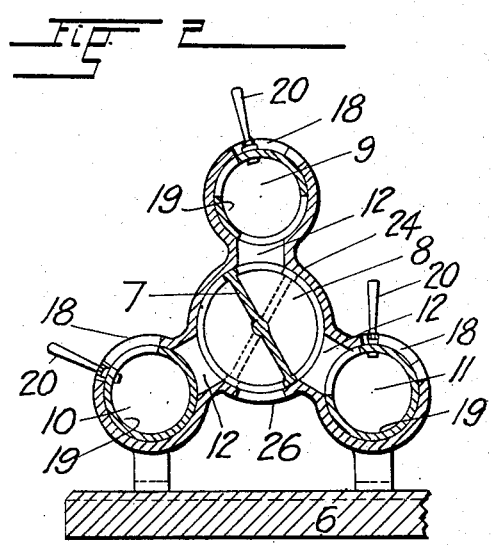
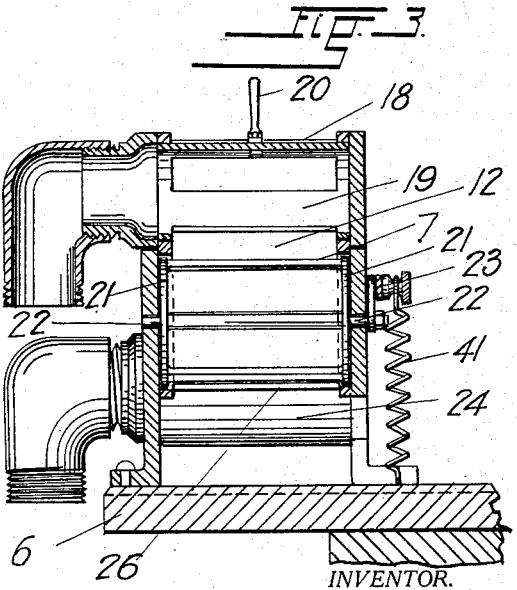
WITNESSES:
INVENTOR.
C. E. H. Armbruster.
BY
ATTORNEY.

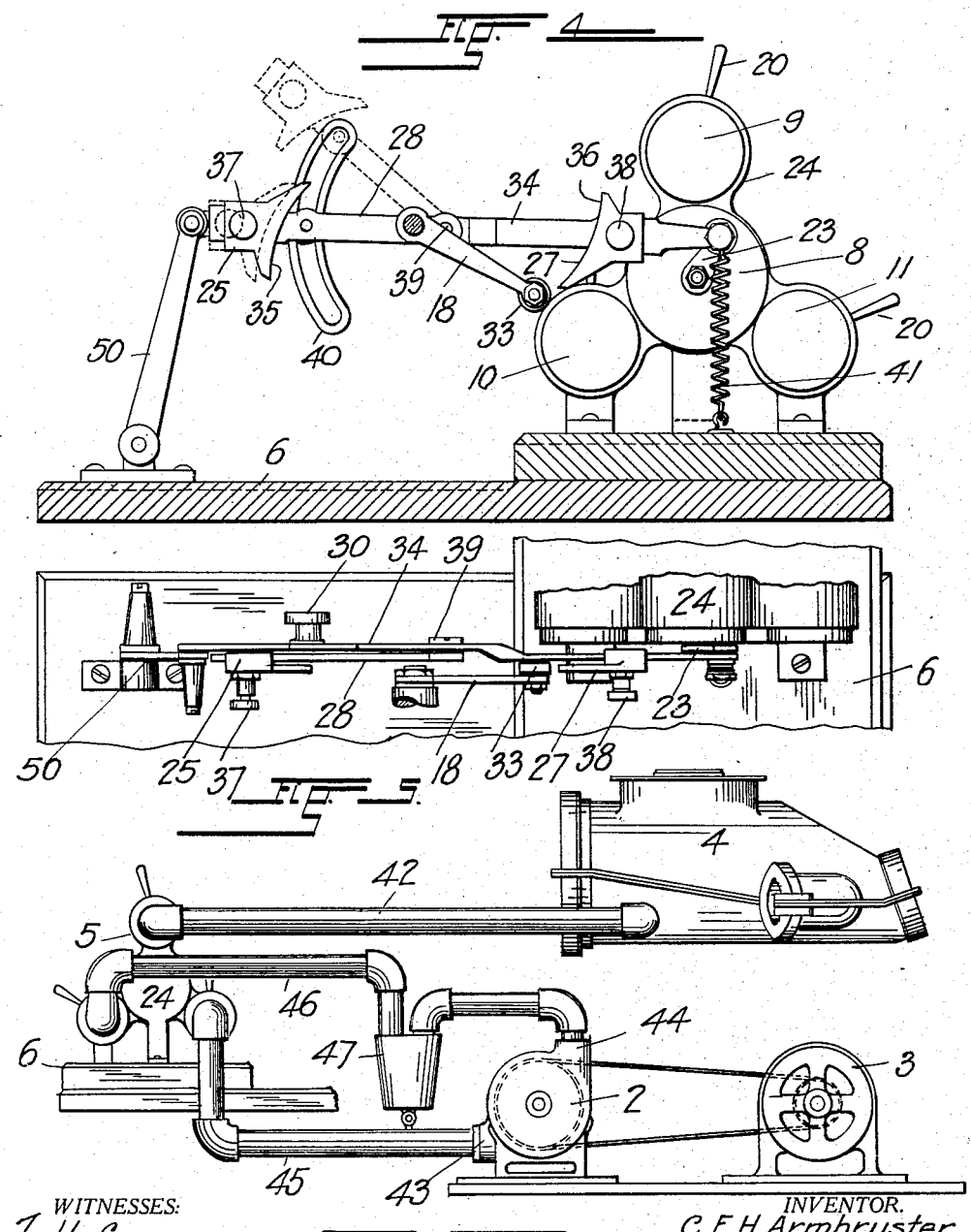

UNITED STATES PATENT OFFICE.

CHARLES E. H. ARMBRUSTER, OF DENVER, COLORADO.

MECHANISM FOR CONTROLLING THE FLOW OF FLUID TO AND FROM AN AIR-TIGHT CHAMBER.

1,172,661.  Specification of Letters Patent.  Patented Feb. 22, 1916.

Application filed September 2, 1914. Serial No. 859,909.

*To all whom it may concern:*

Be it known that I, CHARLES E. H. ARMBRUSTER, a citizen of the United States, residing at Denver, in the county of Denver and State of Colorado, have invented certain new and useful Improvements in Mechanism for Controlling the Flow of Fluid to and from an Air-Tight Chamber, of which the following is a specification.

My invention relates to a mechanism for controlling the flow of air to and from an air pump, and more particularly to mechanism for directing the flow of air between a combined vacuum and pressure pump and a body-casing comprised in the apparatus used in the vacuum and air-pressure method of therapeutic treatment of the human body, shown and described in my application for Patent Number 859,908, filed synchronously with the present one.

The apparatus used in the method above referred to consists briefly of a casing adapted to produce an air-tight chamber over or around a portion of the human-body, a combined exhaust and pressure pump, the inlet and outlet openings of which are connected with said casing, and a controlling mechanism which is capable of regulating and directing the flow of air between the two elements, and which is the subject of the present application.

It is the principal object of my invention to provide a mechanism of the character described, which is capable of adjustment for directing the air to and from the air chamber to produce the following results: 1st, the exhaust of air from the chamber alternately with the supply of air of atmospheric pressure thereto; 2d, the exhaust of air from the chamber alternately with the supply of air of more than atmospheric pressure thereto; 3d, the alternate supply to the chamber of compressed air and air of atmospheric pressure; 4th, the continuous maintenance of a partial vacuum within the chamber; 5th, the continuous maintenance of air of more than atmospheric pressure in the chamber, and 6th, the continuous maintenance of air of atmospheric pressure in the chamber.

In addition to effecting the above enumerated variations in the flow of air between the pump and the casing my improved mechanism is capable of varying the degree of a vacuum produced in the casing, or the density of compressed air supplied thereto, and of varying the proportional lengths of the alternate periods of varying pressures produced in the operation of the apparatus to obtain the results mentioned above under 1, 2 and 3.

In the accompanying drawings in the various views of which like parts are similarly designated, Figure 1 is a plan view of my improved controlling mechanism, Fig. 2, a section along the line 2—2, Fig. 1, Fig. 3, a section along the line 3—3, Fig. 1, Fig. 4, a section along the line 4—4, Fig. 1, Fig. 5, a fragmentary plan view of the parts shown in Fig. 4, and Fig. 6, an elevation of the different elements comprised in the system of coöperative devices of which the present invention forms part.

Referring first to Fig. 6 of the drawings, the reference numeral 2 designates a combined exhaust and pressure pump, 3 an electric motor which has a driving connection with the pump, 4 the casing which is adapted to be applied to a human body to produce an air-tight chamber over or around a portion thereof, and 5 the controlling mechanism which will now be described in detail.

The various parts of the mechanism as shown in Fig. 1 of the drawings, are mounted on a base 6 together with an electric motor 13.

The primary element of the mechanism is an oscillating valve 7 of the butterfly type which is fitted within the chamber 8 of a valve housing 24 supported on the base.

The housing has furthermore three secondary chambers 9, 10 and 11 which connect with the primary chamber by means of ports or passages 12, and with the atmosphere by means of ports 18.

Rotatably fitted in the secondary chambers are hollow cylindrical valves 19 provided with handles 20 which project through the respective atmosphere ports 18 and which determine the two positions of the valves by engagement with the side edges of the openings through which they project. The valve 19 which is fitted in the chamber 9, has two ports one of which is proportioned to constantly maintain the passage 12 in an open condition for the flow of air between the chamber 9 and the primary chamber 8, and the other one of which is adapted to open the normally closed atmosphere port 18 of the chamber 9 by adjustment of the valve. The two valves which are fitted respectively in the chambers 10 and 11, are constructed to open the atmosphere ports of their chambers and simultaneously close the respective passages 12, in one of their positions and to close the said ports and at the same time open the said passages in their other position.

The valve 7 which is mounted for rotation in the chamber 8, is formed integrally with and in diametrical relation to two annular parts 21 which are disposed at opposite ends of the valve for its rotary support.

The valve is furthermore provided at its ends with gudgeons 22 which extend through axial openings in the ends of its chamber and one of these gudgeons carries exteriorly of the housing, a crank 23 for its operative connection with the transmission mechanism by which the rotary motion of the armature of the motor is converted into an oscillating movement of the valve to place the same alternately in the two positions shown in Fig. 2.

The primary chamber has diametrically opposite to the passage 12 which connects with the chamber 9, an opening 26 for the admission of air of atmospheric pressure, whose width like that of the said passage, does not exceed the length of the arc through which the valve moves.

The transmission mechanism above referred to, comprises two friction disks 14 and 15 which are mounted for rotation about parallel axes in bearings on the base 6 and which are frictionally engaged by an intermediary wheel 16. This wheel is rotatably mounted on the plain end portion of a screw 29 which is mounted in a correspondingly threaded bearing 31 on the base and which at its opposite end has a hand-wheel 32 for its manual rotation.

The axes of the disks are out of alinement to permit of the wheel 16 engaging the surfaces of the disks at opposite sides of their respective centers, so that by adjustment of the wheel by rotation of the screw 29 the velocity of the driven disk 15 may be varied with respect to the constant velocity of the driving disk 14. The latter is operatably connected with the armature shaft of the motor by a worm and gear movement designated by the numeral 17 in Fig. 1, and the shaft of the driven disk carries a crank arm 18 which at its outer end is provided with an anti-friction roller 33 for the operation of the contrivance which converts the rotary movement of the disk into a rocking movement of the valve 7. This contrivance consists of a bar 34 which at one of its ends is mounted for reciprocation on a rocker arm 50 pivotally supported in a bearing on the base and which at its opposite end has a pivotal connection with a wrist on the beforementioned crank 23 of the valve 7.

The bar 34 has at opposite sides of the center of rotation of the crank-arm 18, curved faces 35 and 36 which are wiped by the roller 33 at the end of the arm 18 for the purpose of moving the bar alternately in opposite directions. The cam faces are formed on blocks 25 and 27 which are slidably mounted for their adjustment to two determinate positions in which they are secured by means of set screws 37 and 38.

One of the blocks, 27, is mounted on the bar itself, while the other block, 25, is mounted on an arm 28 which at one of its ends is pivotally connected to the bar as at 39. The bar is provided with a slotted segment 40 extending at opposite sides thereof, and the arm 28 carries a set-screw 30 which projects through the slot of the segment to secure the arm in either its normal position in parallel relation to the bar 34 or in its adjusted positions at either end of the segment as indicated in broken lines in Fig. 4.

A coiled spring 41 connected at its extremities to the base 6 and to the end of the bar 34 at which it connects with the valve 23, serves to yieldingly maintain the parts in the positions to which they are moved by the alternate engagement of the roller 33 with the cam faces on the blocks 25 and 27.

Referring to Fig. 6 of the drawings it will be seen that the valve chamber 9 is connected with the body casing 4 by a pipe 42 while the chambers 11 and 10 connect respectively with the inlet opening 43 and the outlet opening 44 of the pump 2 by means of conduits 45 and 46, the last mentioned one of which includes an oil separator 47 of suitable construction.

It will be observed that the oscillating valve 7 places the continuously open passage 12 of the chamber 9 which connects with the body casing 4, alternately in connection with the passages leading to the two chambers 11 and 10 which respectively connect with the inlet opening and the outlet opening of the pump. When it is desired to alternately exhaust the air from the casing 4 and place the same in communication with the atmosphere, the valves are placed in the position shown in Fig. 2 of the drawings in which the atmosphere ports 18 of the chambers 9 and 11 which respectively connect with the casing 4 and with the inlet 43 of the pump, are closed while the corresponding port of the chamber 10 which is connected with the air outlet of the pump, is opened and the passage 12 between the last-mentioned chamber and the chamber 8 is closed. When the valve 7 is moved to the position shown in full lines in Fig. 2, the air contained in the casing 4 will be drawn through the pipe 42 into the chamber 9 and through the therewith communicating chamber 11 into the conduit 45 through which it flows to the pump, and the compressed air which at the same time is delivered from the pump through its outlet opening 44 is simultaneously discharged through the port 18 of the chamber 10 with which said opening connects. When the oscillating valve 7 moves to its other position which is indicated in Fig. 2 of the drawings in broken lines, the communication between the two chambers 9 and 11 is discontinued and air of atmospheric pressure which had entered the valve chamber through the port 26 is admitted to the casing 4 through the continually open part 12 of the chamber 9. It will thus be seen that during the oscillating movement of the valve 7 when the valves 19 are arranged as shown and described, the portion of a body within the casing is subjected alternately to a partial vacuum and to atmospheric air pressure. If it is desired to subject the part of the body within the casing alternately to atmospheric pressure and air pressure exceeding atmospheric, the positions of the valves in the chambers 10 and 11 are reversed, with the result that by the oscillating movement of the valve 7 the chamber 9 is placed alternately in communication with the atmosphere and with the outlet opening of the pump instead of with the inlet opening as above. Should it be required to continuously maintain a partial vacuum in the casing, the motor 13 is stopped, the valve 7 placed in the position shown in full lines in Fig. 2, and the valves in the chambers 10 and 11 placed in the positions in which they have been shown in the same figure. To maintain a continuous air pressure more than atmospheric in the casing, the valve 7 is moved to the position shown in broken lines and the position of the valves in the chambers 11 and 10 are reversed, and to connect the casing continuously with the atmosphere, it is but necessary to open the port 18 of the chamber 9 by adjustment of the corresponding valve.

The degree of vacuum produced in the casing 4 during the operation of the system may be varied by partially opening the port 18 of the chamber 9, whereby to admit air into the casing, and the degree of air pressure within the casing may be regulated in a similar manner by permitting the escape of air from the same. To vary the proportional lengths of the alternate periods of different air pressures within the casing, the block 25 on which the cam face 35 is formed, is moved to either end of the segment on the bar by adjustment of the arm 28 as shown in broken lines in Fig. 4, with the result that the arc in the circle of movement of the roller at the end of the crank 18 between the ends of the faces 35 and 36, which normally are equal, are differently proportioned, and the valve 7 will remain longer in one of its positions than in the other. If it is desired to effect the different changes in the flow of air to and from the casing by means other than the valves in the chambers 10 and 11, the ports 18 of the latter may both be closed and one or the other of the blocks 25 and 27 moved to a position farther away from the center of the circle in which the roller has its motion, as indicated in broken lines at the left-hand side of Fig 4, whereby to reduce the extent of the movement of the oscillating valve 7 and thereby place either one of the chambers 10 and 11 alternately in communication with the chamber 9 and with the atmosphere through the port 26.

The velocity with which the oscillating valve moves with relation to the substantially constant velocity of the motor 13, may be varied within determinate limits by adjustment of the intermediary wheel 16, and it is obvious that while for the purposes of my invention it is preferable to employ separate motors for the operation of the controlling mechanism and the air pump, both elements may if so desired, be connected through the instrumentality of proper motion transmission devices, with one and the same motor.

Having thus described my invention what I claim and desire to secure by Letters-Patent is:

1. A mechanism of the character described comprising a valve-housing having a port for its connection with an air-chamber, a second port for its connection with an air-pump and a third port for its connection with the atmosphere, a valve within said housing, capable of operation to establish and break communication between the first and second ports during alternate periods, and a valve in the connection of the first mentioned port with the air-chamber, for placing the chamber in communication with the atmosphere whereby to vary the degree of a vacuum or an air-pressure within the same.

2. Mechanism of the character described, comprising a valve-housing having a port for its continuous connection with an air-chamber, and two ports for its connection with the intake opening and the discharge-opening of an air-pump, a valve within said housing capable of operation for placing the first mentioned port alternately in communication with the two other ports, and adjustable valves adapted to close the connection of either of the said pump-openings with the valve-housing.

3. Mechanism of the character described comprising a valve-housing having a port for its continuous connection with an air-chamber, and two ports for its connection with the intake opening and the discharge-opening of an air-pump, a valve within said housing capable of operation for placing the first mentioned port alternately in communication with the two other ports, and adjustable valves adapted to close the connection of either of the said pump-openings with the valve-housing, and to simultaneously place the disconnected opening in communication with the atmosphere.

4. Mechanism of the character described comprising a valve-housing having a port for its continuous connection with an air-chamber, and two ports for its connection with the intake opening and the discharge-opening of an air-pump, a valve within said housing capable of operation for placing the first mentioned port alternately in communication with the two other ports, an adjustable valve in the connection between the first mentioned port and the air-chamber for placing the latter in communication with the atmosphere, and adjustable valves adapted to close the connection of either one of the said pump-openings with the valve housing and to simultaneously place the disconnected opening in communication with the atmosphere.

5. Mechanism of the character described comprising a valve-housing having a port for its continuous connection with an air-chamber, and two ports for its connection with the intake opening and the discharge-opening of an air-pump, a valve within said housing capable of operation for placing the first mentioned port alternately in communication with the two other ports, an adjustable valve in the connection between the first mentioned port and the air-chamber for placing the latter in communication with the atmosphere, and adjustable valves adapted to close the connection of either one of the said pump-openings with the valve housing.

6. Mechanism of the character described comprising a valve-housing having a port for its continuous connection with an air-chamber, an opening for its connection with the atmosphere, and two ports for its connection with the intake opening and the discharge-opening of an air-pump, a valve within said housing capable of operation for placing the first mentioned port alternately in communication with the two other ports, and adjustable valves adapted to close the connection of either of the said pump-openings with the valve-housing.

7. A mechanism of the character described comprising a valve-housing having a continuously open port for its connection with an air-chamber, and a second port for its connection with an air-pump, a valve in the housing, capable of operation for establishing and breaking the communication between the two ports during alternate periods, and an adjustable valve for closing the connection between the housing and the air pump and simultaneously placing the said connection in communication with the atmosphere.

8. Mechanism of the character described comprising a housing having a primary valve chamber and two secondary chambers which are separately connected with the primary chamber, by ports, the said secondary chambers having means for their separate connection with air-receiving or air-delivering elements, and one of the said secondary chambers having a port for its connection with the atmosphere, a valve in the last-mentioned chamber adapted for adjustment to close the port connecting its said chamber with the primary chamber and to open the atmosphere port of its said chamber, and a valve in the primary chamber, capable of operation to alternately establish and break the communication between the said secondary chambers.

9. Mechanism of the character described comprising a housing having a primary valve-chamber and secondary valve-chambers which are separately connected with the primary chamber by ports and which have ports to connect them with the atmosphere, valves in said chambers to control the flow of fluid through and between their ports, and a valve in the primary chamber, capable of operation to establish and break communication between the secondary chambers, said secondary chambers having means for their separate connection with air-receiving or air-delivering elements.

10. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including means for varying the rate of motion of the valve with respect to the constant velocity of the motor.

11. Mechanism of the character described comprising a valve chamber having ports for its connection with air-receiving or air-delivering elements, a valve in said chamber for controlling the flow of air between its ports, a motor, and apparatus for transmitting the movement of the motor to the said valve, including means for varying the rate of motion of the valve with respect to the constant velocity of the motor.

12. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including adjustable means for varying the proportional lengths of the alternate movements of the valve in opposite directions.

13. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including adjustable means for varying the extent of the valve-movements.

14. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a pair of friction-disks in operative connection with the valve and with the motor, and an adjustable intermediary wheel in engagement with said disks for transmitting the movement of one to the other.

15. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor and a reciprocating bar having an operative connection with the valve and provided with faces at opposite sides of the axis of rotation of the said cam-member to be alternately engaged thereby, for the reciprocation of the bar.

16. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor, a reciprocating bar having an operative connection with the valve, and blocks which are mounted on said bar at opposite sides of the axis of rotation of said member, and which are provided with faces to be alternately engaged by the said member for the reciprocation of the bar, the said blocks being adjustable on the bar for varying the distances between their respective faces and the axis of rotation of the cam-member.

17. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor, a reciprocating bar having an operative connection with the valve and provided with faces at opposite sides of the axis of rotation of the member, to be alternately engaged thereby for the reciprocation of the bar, and means for the adjustment of one of said faces for varying its position with relation to the other face, in the circle of movement of said member.

18. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor, a reciprocating bar having an operative connection with the valve, an arm pivoted on said bar, and means for securing said arm in different angular positions with relation to the bar, the said arm and the said bar having faces disposed at opposite sides of the axis of rotation of the said member to be alternately engaged thereby for the reciprocation of the bar.

19. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor, and a reciprocating bar having a crank connection with the said valve, and provided with faces at opposite sides of the axis of rotation of the said member to be alternately engaged thereby for the reciprocation of the bar.

20. Mechanism of the character described comprising a valve chamber having ports for its connection with air-receiving or air-delivering elements, a valve in said chamber for controlling the flow of air between its ports, a motor, and apparatus for converting the rotary movement of the motor into an oscillatory movement of the said valve, including a rotary cam-member in operative connection with the motor, a reciprocating bar operatively connected with the valve and provided with faces at opposite sides of the axis of rotation of the said member to be alternately engaged thereby for the reciprocation of the bar, and a spring to yieldingly maintain the bar in the positions to which it is moved by the action of said member.

In testimony whereof I have affixed my signature in presence of two witnesses.

CHARLES E. H. ARMBRUSTER.

Witnesses:
F. H. CUNO,
L. RHOADES.